US011459799B2

(12) United States Patent
Maybank (10) Patent No.: US 11,459,799 B2
(45) Date of Patent: Oct. 4, 2022

(54) SECURITY LOCK SYSTEM FOR A FIFTH WHEEL HITCH (71) Applicant: Stephen A. Maybank, Brigton, TN (US)

(72) Inventor: Stephen A. Maybank, Brigton, TN (US)

(*) Notice: Subject to any disclaimer, the term of this patent is extended or adjusted under 35 U.S.C. 154(b) by 721 days.

(21) Appl. No.: 16/446,413

(22) Filed: Jun. 19, 2019

(65) Prior Publication Data
US 2019/0383064 A1 Dec. 19, 2019

Related U.S. Application Data (63) Continuation-in-part of application No. 29/664,022, filed on Sep. 20, 2018, now Pat. No. Des. 950,427.

(60) Provisional application No. 62/686,786, filed on Jun. 19, 2018.

(51) Int. Cl.
E05B 73/00 (2006.01)
B62D 53/10 (2006.01)
E05B 17/14 (2006.01)
B62D 53/08 (2006.01)

(52) U.S. Cl.
CPC ............. *E05B 73/00* (2013.01); *B62D 53/08* (2013.01); *B62D 53/085* (2013.01); *B62D 53/0807* (2013.01); *B62D 53/10* (2013.01); *E05B 17/142* (2013.01)

(58) Field of Classification Search
CPC .. B62D 53/085; B62D 53/0807; B62D 53/08; B62D 53/10; E05B 73/00; E05B 17/14; E05B 17/142; E05B 17/16
See application file for complete search history.

(56) References Cited

U.S. PATENT DOCUMENTS

| 1,513,432 | A | * | 10/1924 | Shaw | E05B 17/16 70/428 |
| 1,545,180 | A | * | 7/1925 | Stephen | B62D 53/08 280/439 |
| 1,922,395 | A | * | 8/1933 | Reld | B62D 53/08 280/422 |
| 4,619,122 | A | * | 10/1986 | Simpson | E05B 67/36 D8/347 |

(Continued)

FOREIGN PATENT DOCUMENTS

| DE | 4228625 C1 | * | 3/1994 | ........... B62D 25/147 |
| DE | 10315690 A1 | * | 11/2004 | ............ B60D 1/485 |
| EP | 0653011 B1 | | 12/1997 | |

*Primary Examiner* — Tony H Winner
*Assistant Examiner* — Maurice L Williams (57) ABSTRACT A security lock system for a fifth wheel hitch is system that restricts access to the connection between a fifth wheel hitch and a truck bed. The system includes a receiver lock, a fifth wheel hitch, a first sleeve, a second sleeve, a lock engagement channel, and a key. The receiver lock shields a securing mechanism of the fifth wheel hitch. The receiver lock connects with a base frame of the fifth wheel hitch through the lock engagement channel. The first sleeve and the second sleeve uphold the receiver lock against the lock engagement channel. A retractable locking bolt and a locking assembly are connected to each other with the key. The retractable locking bolt and the locking assembly remain stationary as the retractable locking bolt includes a first tubular body and a first stopper, and the locking assembly includes a second tubular body and a second stopper.

18 Claims, 7 Drawing Sheets (56) References Cited

U.S. PATENT DOCUMENTS

| | | | |
|---|---|---|---|
| 4,683,737 A | 8/1987 | Armstrong | |
| 5,344,172 A * | 9/1994 | Jaun | B62D 53/0828 |
| | | | 280/491.1 |
| 5,664,445 A * | 9/1997 | Chang | E05B 67/365 |
| | | | 70/386 |
| 5,992,193 A | 11/1999 | Bronk, III | |
| 6,170,850 B1 * | 1/2001 | Works | B62D 53/08 |
| | | | 280/433 |
| 6,862,904 B1 | 3/2005 | Hubbart | |
| 7,225,649 B2 * | 6/2007 | Wyers | B60D 1/60 |
| | | | 70/56 |
| 7,750,509 B2 * | 7/2010 | Anderson | H01H 27/00 |
| | | | 307/115 |
| 7,988,177 B2 * | 8/2011 | Colibert | B62D 53/0814 |
| | | | 280/901 |
| 8,607,600 B2 * | 12/2013 | Burmesch | B60D 1/60 |
| | | | 70/34 |
| 8,827,298 B2 * | 9/2014 | Diller | B62D 53/0842 |
| | | | 280/433 |
| 9,505,279 B2 * | 11/2016 | Poirier | B62D 53/0814 |
| 2005/0160775 A1 | 7/2005 | Evans | |

\* cited by examiner

SECURITY LOCK SYSTEM FOR A FIFTH WHEEL HITCH

The current application claims a priority to the U.S. Provisional Patent application Ser. No. 62/686,786 filed on Jun. 19, 2018.

FIELD OF THE INVENTION

The present invention relates generally to security locks. More specifically, the present invention is a security lock system for a fifth wheel hitch.

BACKGROUND OF THE INVENTION

In present times, individual end-users are known to employ a variety of devices and tools to facilitate transport of heavy loads external to operable transport vehicles. One known means of securing a trailer to a vehicle is the fifth-wheel device. This device allows a user to create a height-adjustable connection point for a congruent trailer hitch in the bed of a pick-up truck or similar vehicle (provided a clear horizontal space in the rear of the vehicle on which to mount the fifth-wheel device). This connection point allows a load to be carried (ideally) directly over the rear axle of a vehicle with the means to adjust relative angle of the towing vehicle and trailer in such a way as to not overstress the rear axle of the trailer. The fifth wheel is generally secured to a vehicle via a set of adjustable bolts and fasteners in such a way as to allow the fast detachment of the device when not in use. This potentially allows for the unauthorized adjustment or removal of the fifth wheel device, which may lead to theft of the device and trailer, or potentially dangerous towing scenarios due to improper adjustment of the fifth wheel device.

The present invention aims to provide a means of temporarily locking the fifth wheel device to the towing vehicle. The present invention will feature a means of temporarily locking the adjustable fasteners into position by blocking access to the adjustable fasteners when locked into position. The present invention will also include a means of access control, ideally a paired physical key, to prevent unauthorized removal from the fifth-wheel device. To survive and maintain function in harsh environments, the body of the present invention will be ruggedized, tamper-resistant, and waterproof. Additionally, the present invention will include a means of protecting the relatively fragile locking components when not in use, preventing damage or fouling of the internals.

DETAILED DESCRIPTION OF THE INVENTION

All illustrations of the drawings are for the purpose of describing selected versions of the present invention and are not intended to limit the scope of the present invention.

The present invention is a security lock system for a fifth wheel hitch that prevents limits access to the connection between a fifth wheel hitch and a truck bed. The present invention, more specifically, blocks access to a bolt that secures a fifth wheel hitch to a truck bed. The present invention is compact and easily connected with a fifth wheel hitch. The present invention utilizes the existing structure of a fifth wheel hitch and the functions that allow a trailer to connect with the fifth wheel hitch are not inhibited. The present invention comprises a receiver lock 1, a fifth wheel hitch 23, a first sleeve 25, a second sleeve 27, a lock engagement channel 29, and a key 30, seen in FIG. 1, FIG. 2, FIG. 6, and FIG. 7. The receiver lock 1 connects with a fifth wheel hitch 23 and inhibits the path for a user to access the connection between the fifth wheel hitch 23 and the truck bed. The receiver lock 1 comprises a retractable locking bolt 2 and a locking assembly 12. The retractable locking bolt 2 covers the connection between the fifth wheel hitch 23 and the truck bed. The locking assembly 12 attaches the retractable locking bolt 2 with the fifth wheel hitch 23. In order for the receiver lock 1 to remain connected with the fifth wheel hitch 23 and prevent the receiver lock 1 from sliding within the first sleeve 25, the second sleeve 27, and the lock engagement channel 29, the retractable locking bolt 2 comprises a first tubular body 3 and a first stopper 4. Moreover, a first inner diameter 26 of the first sleeve 25 is equal to a first outer diameter 5 of the first stopper 4. Similarly, the locking assembly 12 comprises a second tubular body 13 and a second stopper 14, and a second inner diameter 28 of the second sleeve 27 is equal to a second outer diameter 15 of the second stopper 14. The fifth wheel hitch 23 connects a trailer to a truck, specifically the truck bed. The fifth wheel hitch 23 comprises a securing mechanism 23 and a base frame 24. The securing mechanism 23 attaches a trailer to the fifth wheel hitch 23. Moreover, the securing mechanism 23 includes a security bolt that locks and unlocks the connection between the base frame 24 and the truck bed. The base frame 24 mounts and uplifts the securing mechanism 23 with the truck bed. The first sleeve 25 and the second sleeve 27 support and house the receiver lock 1. The lock engagement channel 29 allows the receiver lock 1 to traverse through the fifth wheel hitch 23 without damaging the structural integrity of the fifth wheel hitch 23. The key 30 locks and unlocks the receiver lock 1.

The overall arrangement of the aforementioned components shields the securing mechanism 23 for a fifth wheel hitch 23 with a truck bed, thereby securing the fifth wheel with the truck bed. In order for the receiver lock 1 to connect with the base frame 24, the lock engagement channel 29 traverses through the base frame 24, seen in FIG. 7. The receiver lock 1 is positioned to cover the securing mechanism 23 as the lock engagement channel 29 is positioned adjacent to the securing mechanism 23. In order for the receiver lock 1 to be fastened and supported against the lock engagement channel 29, the first sleeve 25 and the second sleeve 27 are fixed to the base frame 24, and the base frame 24 is positioned between the first sleeve 25 and the second sleeve 27. The first sleeve 25 and the second sleeve 27 are concentrically aligned with the lock engagement channel 29 so that the retractable locking bolt 2 and the locking assembly 12 may continuously traverse through the first sleeve 25 and second sleeve 27, respectively, and engage with one another through the lock engagement channel 29. In order for the retractable locking bolt 2 to remain stationary while positioned within the first sleeve 25, the first stopper 4 is terminally fixed with the first tubular body 3. Similarly, the second stopper 14 is terminally fixed with the second tubular body 13 so that the locking assembly 12 remains stationary while positioned within the second sleeve 27. Consequently, the position of the retractable locking bolt 2 is secured adjacent the securing mechanism 23. The first stopper 4 is slidably engaged within the first sleeve 25, and the second stopper 14 is slidably engaged within the second sleeve 27 thereby allowing the retractable locking bolt 2 and the locking assembly 12, respectively, to be removably attached with the first sleeve 25 and the second sleeve 27. In order to limit access to the securing mechanism 23, the key 30 is operatively coupled with the receiver lock 1, wherein the locking assembly 12 and the retractable locking bolt 2 are connected and disconnected with each other with the key 30.

The retractable locking bolt 2 latches into the locking assembly 12 as the retractable locking bolt 2 further comprises a first slot 6, a shaft 7, a base 8, an annular notch 9, and a head 10, seen in FIG. 3, FIG. 4, FIG. 6, and FIG. 7. The first slot 6 houses and positions the shaft 7 within first tubular body 3 and the first stopper 4. The shaft 7 offsets the head 10 and the annular notch 9 from the first tubular body 3 and the first stopper 4 and positions the head 10 and the annular notch 9 within the locking assembly 12. The base 8 connects and orients the shaft 7 within the first slot 6. The annular notch 9 locks and unlocks the retractable locking bolt 2 with the locking assembly 12. Moreover, the annular notch 9 is defined with the shaft 7 and the head 10. In order for the first tubular body 3, and consequently the first stopper 4, to remain attached with the locking assembly 12, first slot 6 is positioned within the first tubular body 3 and the first stopper 4. Moreover, the base 8 is positioned adjacent the shaft 7 and is fixed to the shaft 7. Similarly, the head 10 is positioned adjacent the shaft 7, opposite the base 8. The retractable locking bolt 2 shields the securing mechanism 23 while being attached with the locking assembly 12 as the base 8 is oriented towards the first tubular body 3, and the head 10 is oriented towards the first stopper 4. The annular notch 9 is laterally traversing into the shaft 7 and is positioned adjacent the head 10 so that the locking mechanism 16 may latch onto the annular notch 9. The retractable locking bolt 2 is easily positioned and secured with the first sleeve 25 and engaged with the locking assembly 12 as shaft 7 slidably engages with the first slot 6. Furthermore, a locking mechanism 16 of the locking assembly 12 is engaged with the annular notch 9.

Figure 1:
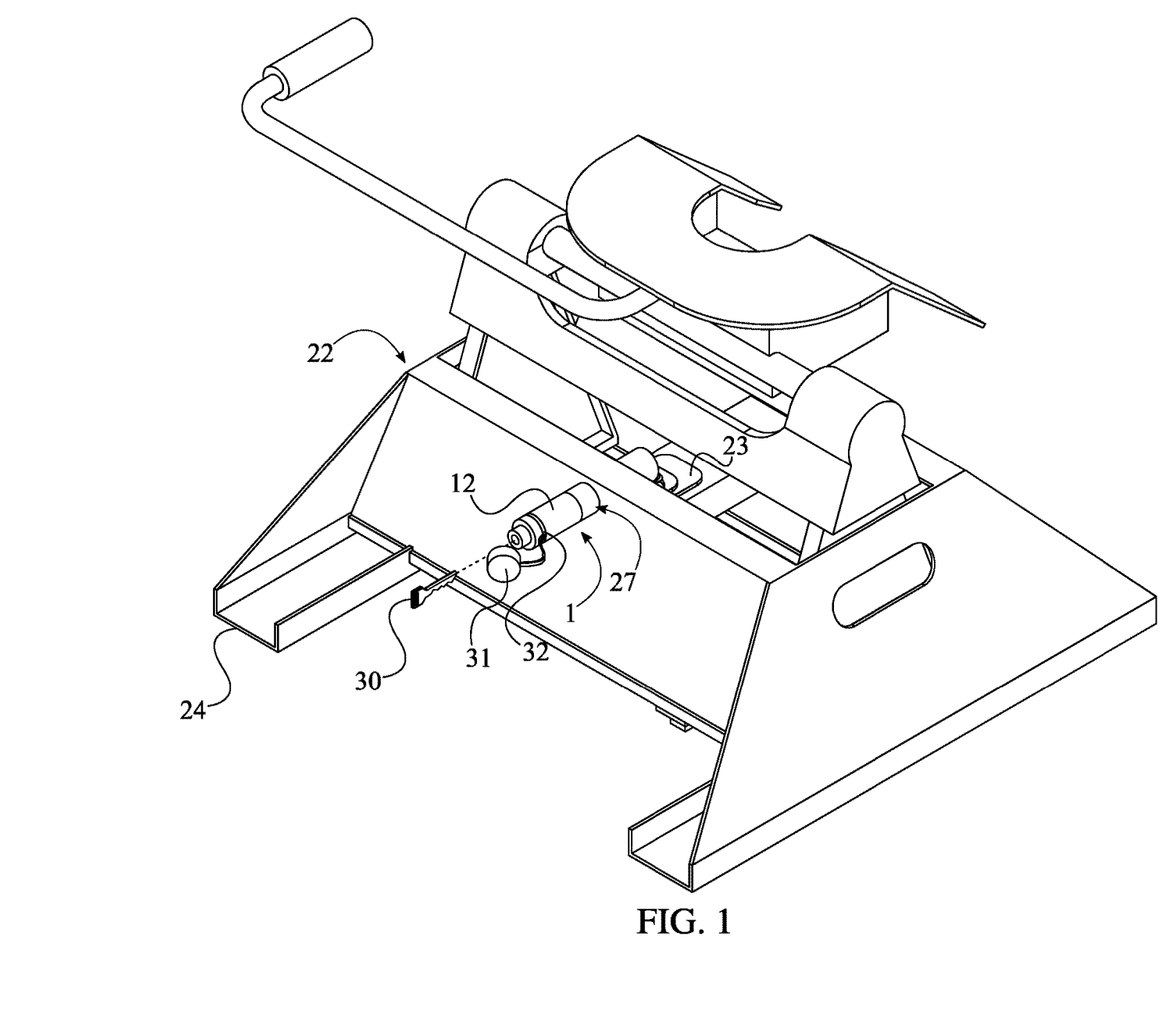
FIG. 1 is a rear perspective view of the present invention.
Figure 2:
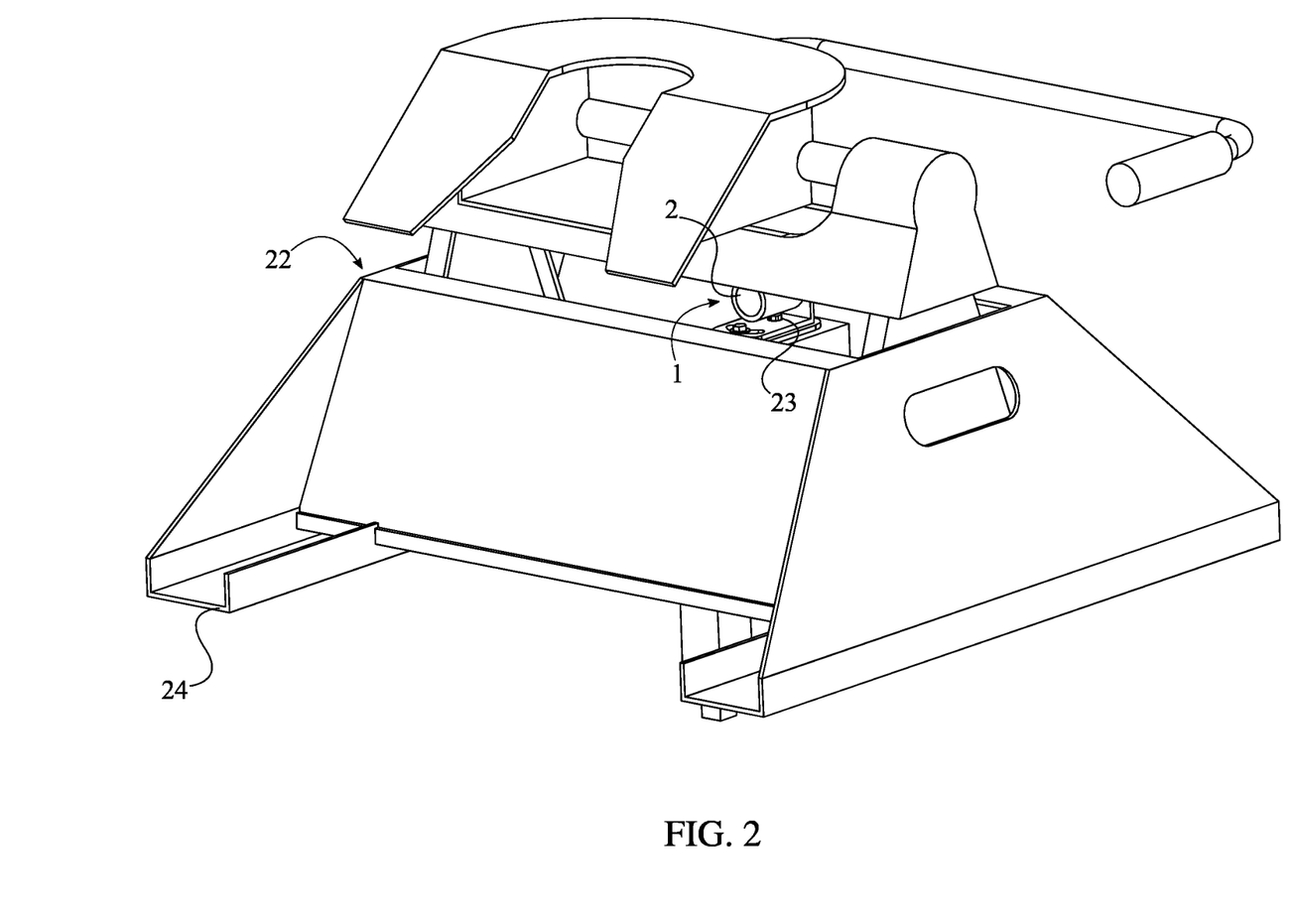
FIG. 2 is a front perspective view of the present invention.
Figure 3:
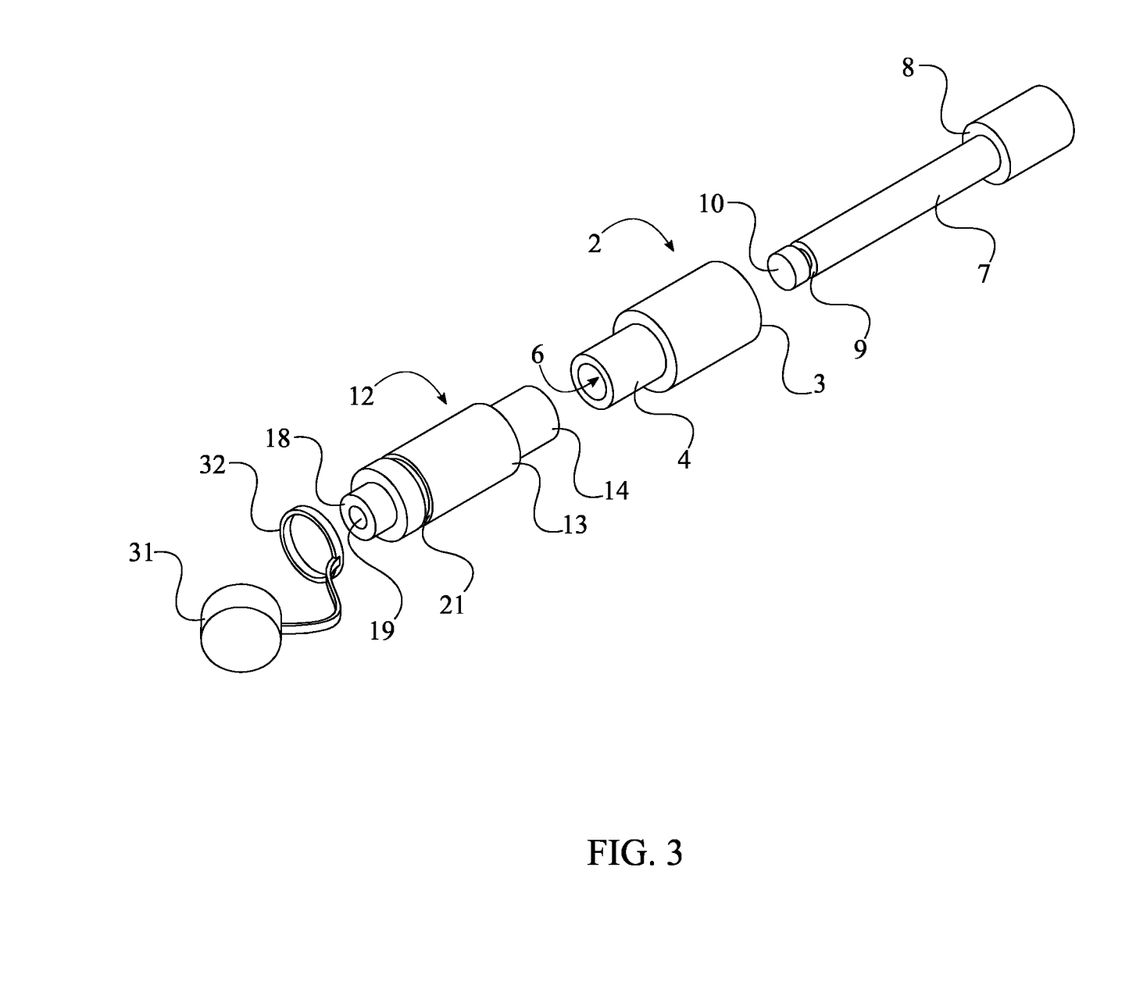
FIG. 3 is a front exploded view of a receiver lock of the present invention.
Figure 4:
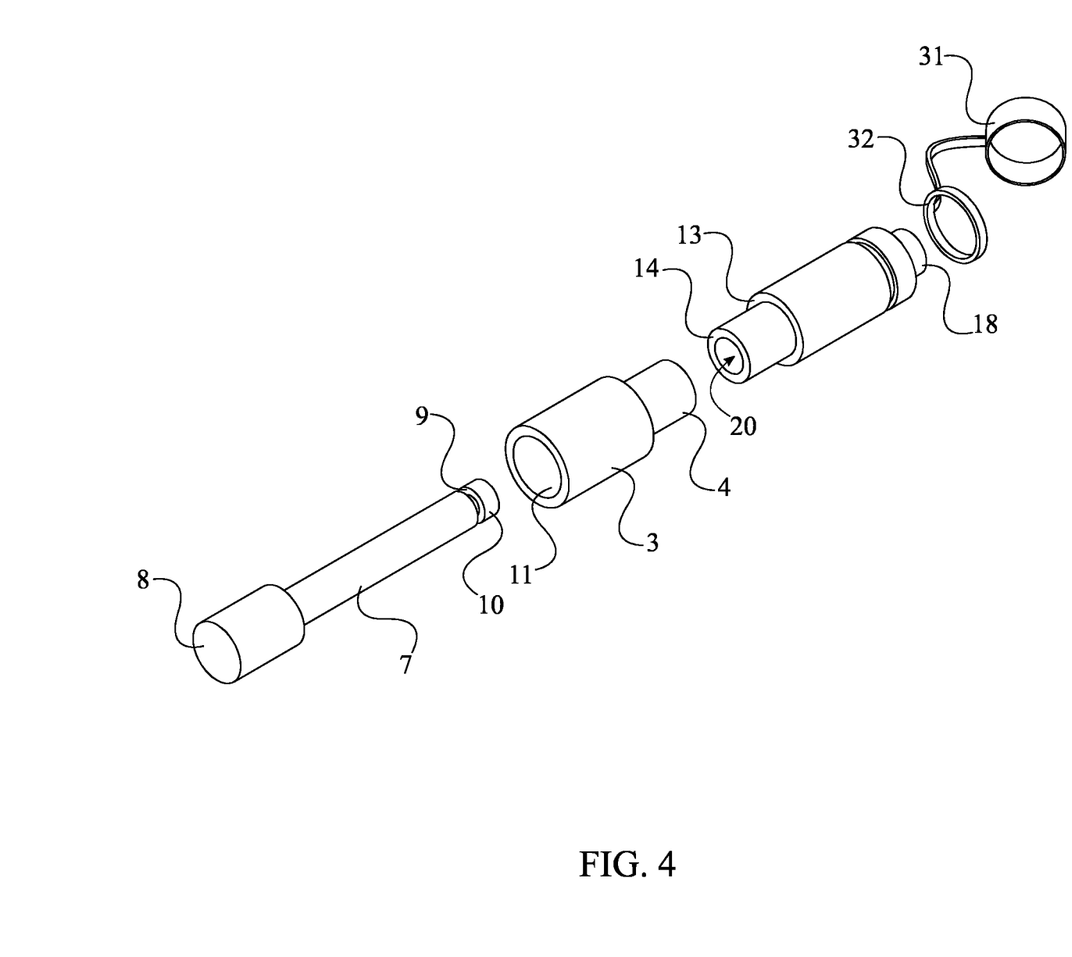
FIG. 4 is a rear exploded view of the receiver lock of the present invention.
Figure 5:
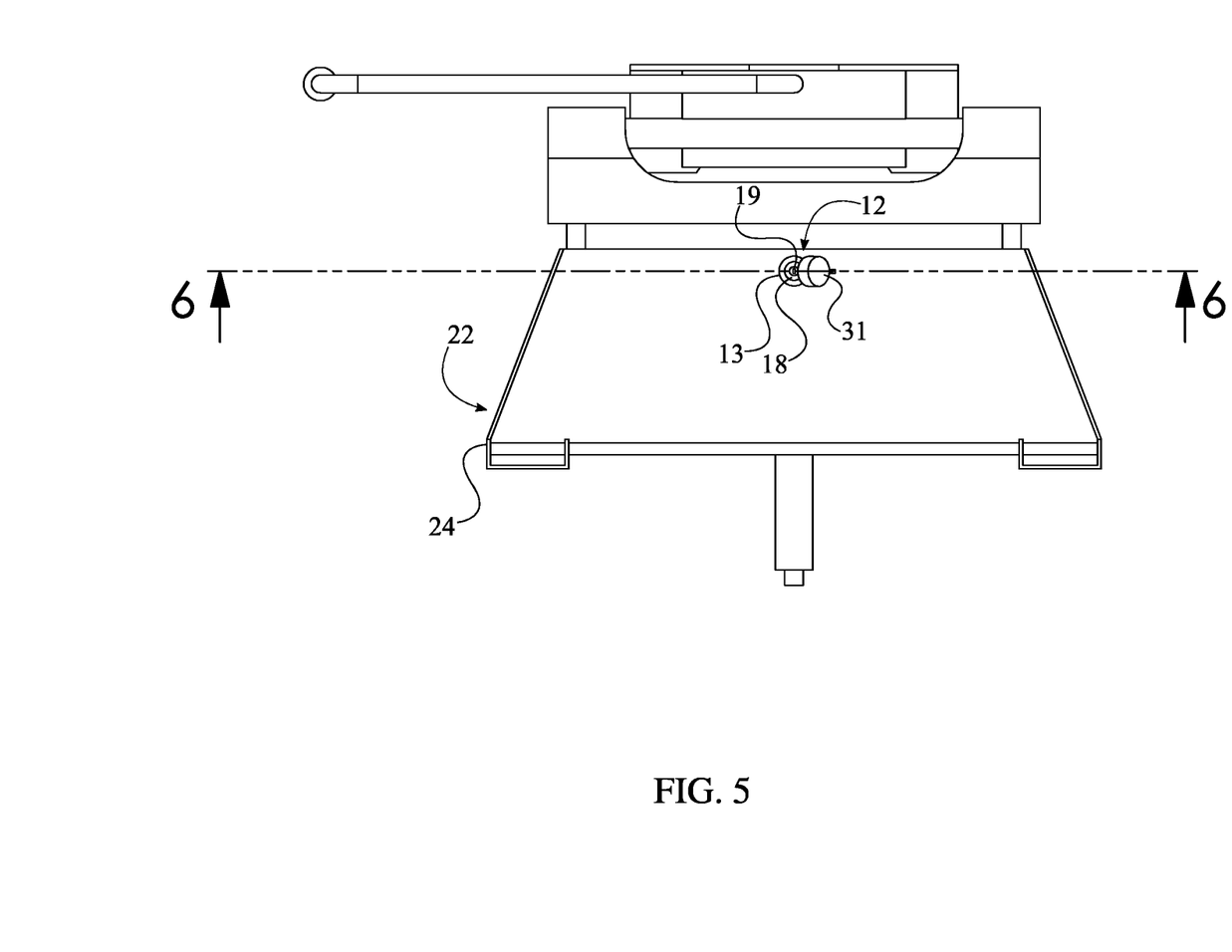
FIG. 5 is a front side view of the present invention.
Figure 6:
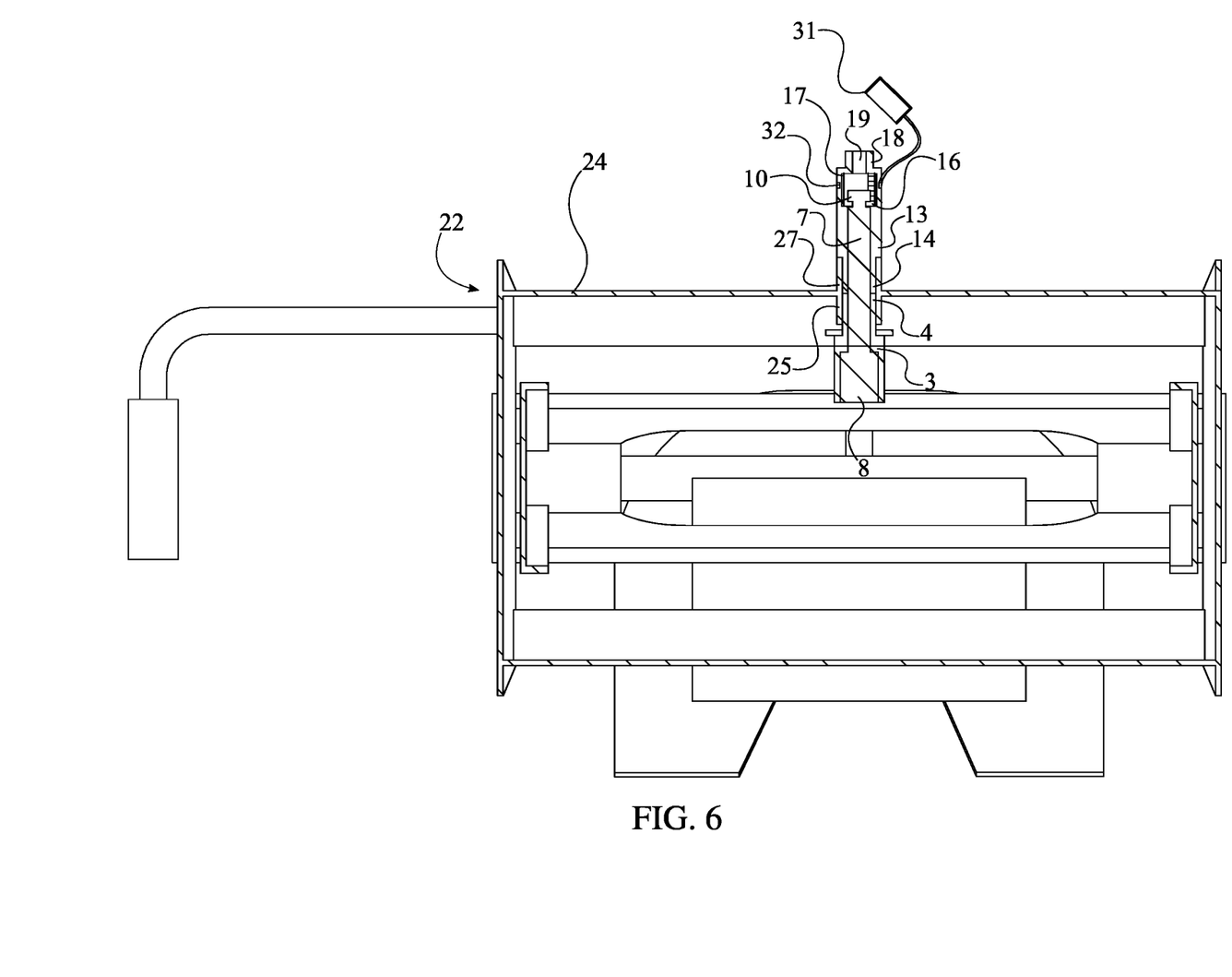
FIG. 6 is a cross-section view of FIG. 5 along line 6-6 of the present invention.
Figure 7:
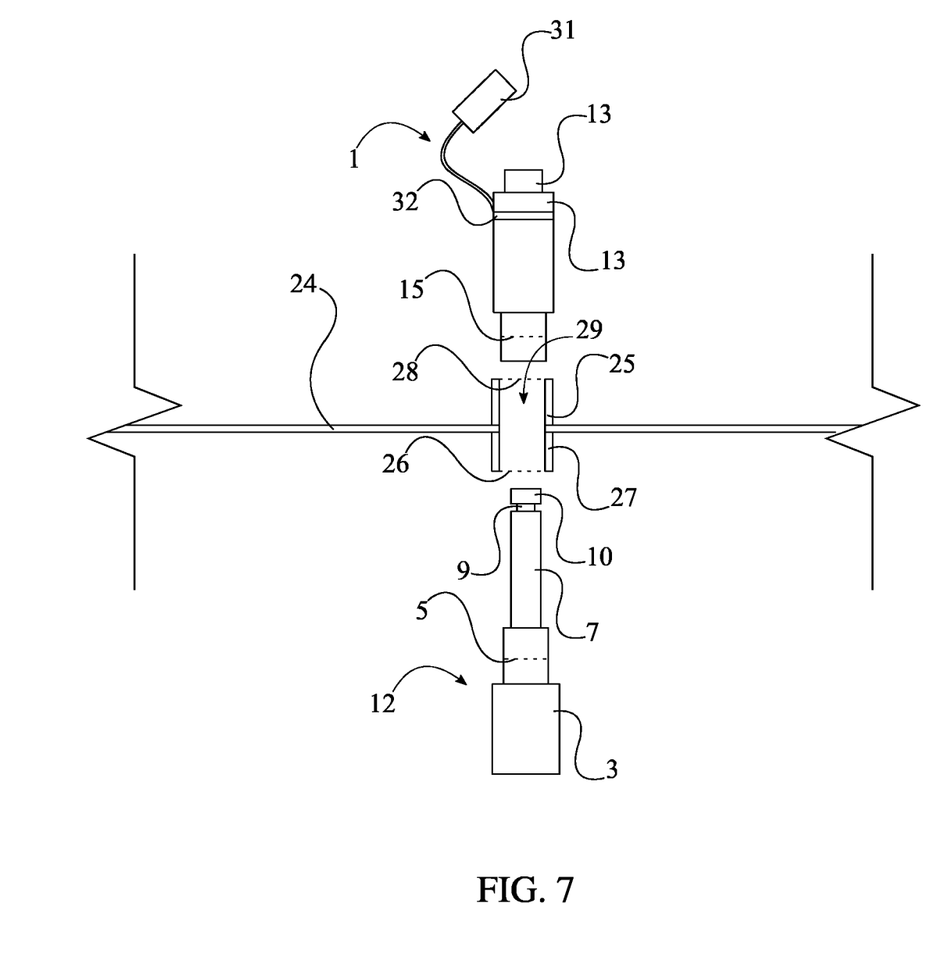
FIG. 7 is a schematic view of a receiver lock with a first cylinder, a second cylinder, and a base frame of a fifth wheel hitch of the present invention.

In the preferred embodiment of the present invention, the retractable locking bolt 2 comprises a bed 11, seen in FIG. 4. The bed 11 prevents the first tubular body 3 and the first stopper 4 from slipping past the shaft 7 while the locking mechanism 16 is latched within the locking assembly 12. The bed 11 is integrated into the first tubular body 3 and is positioned opposite the first stopper 4. More specifically, the bed 11 is positioned concentric with the first slot 6 so that the shaft 7 freely and continuously traverses through the first tubular body 3 and the first stopper 4. The base 8 is also slidably engaged within the bed 11, thereby preserving the engagement of the shaft 7 within the first slot 6.

The retractable locking bolt 2 is secured within the locking assembly 12 as the locking assembly 12 comprises a locking cylinder 17, a locking mechanism 16, a plug 18, a keyhole 19, and a second slot 20, also seen in FIG. 3, FIG. 4, FIG. 6, and FIG. 7. The locking cylinder 17 houses the locking mechanism 16, as well as, positions and orients the plug 18. The locking mechanism 16 latches and unlatches the locking assembly 12 with the retractable locking bolt 2. The plug 18 allows the key 30 to engage with the locking mechanism 16. The keyhole 19 allows the key 30 to traverse through the plug 18 and access the locking mechanism 16. The second slot 20 accommodates the retractable locking bolt 2. The key 30 may access the locking mechanism 16 while the locking assembly 12 is engaged with the second sleeve 27 as the locking cylinder 17 is mounted within the tubular housing and positioned opposite the second stopper 14 along the second tubular body 13. Moreover, the plug 18 is rotatably mounted within the locking cylinder 17 and is externally positioned with the second tubular body 13. The key 30 engages the locking mechanism 16 with the plug 18 as the keyhole 19 traverses into the plug 18, opposite the locking cylinder 17, and the key 30 slidably engages with the keyhole 19. The locking mechanism 16 is mounted within the locking cylinder 17 so that the locking mechanism 16 is accessible by the key 30 and securely positioned within the second tubular body 13. Similar to the retractable locking bolt 2, the second slot 20 is positioned within the second stopper 14 and the second tubular body 13 in order for the shaft 7, with the annular notch 9 and the head 10, to freely traverse into the second stopper 14 and second stopper 14 and engage with the locking mechanism 16. Moreover, the retractable locking bolt 2 is slidably engages with the second slot 20. The position of the first tubular body 3 adjacent the securing mechanism 23 and the first stopper 4 within the sleeve is secured as the key 30 is operatively coupled with the plug 18, wherein the key 30 locks and unlocks the retractable locking bolt 2 with the locking mechanism 16.

The plug 18, the keyhole 19, and the locking mechanism 16 of the locking assembly 12 are protected as the present invention further comprises a cap 31 and a ring 32, seen in FIG. 1, FIG. 3, FIG. 4, FIG. 5, FIG. 6, and FIG. 7. The cap 31 and the ring 32 are connected with the locking assembly 12 as the locking assembly 12 further comprises an annular indentation 21. The annular indentation 21 traverses into the second tubular body 13 and is positioned around the second tubular body 13. The plug 18, the keyhole 19, and the locking mechanism 16 are covered with the cap 31 as the annular indentation 21 is positioned opposite the second stopper 14. The ring 32 is positioned within the annular indentation 21, and the cap 31 is tethered with the ring 32, thereby connecting the cap 31 to the second tubular body 13 with the ring 32. The locking assembly 12 remains accessible while covered by the cap 31 as cap 31 is frictionally and terminally engaged with the second tubular body 13.

Although the invention has been explained in relation to its preferred embodiment, it is to be understood that many other possible modifications and variations can be made without departing from the spirit and scope of the invention as hereinafter claimed.

What is claimed is:

1. A security lock system for a fifth wheel hitch comprises:
  a receiver lock;
  a fifth wheel hitch;
  a first sleeve;
  a second sleeve;
  a lock engagement channel;
  a key;
  the receiver lock comprises a retractable locking bolt and
    a locking assembly;

the retractable locking bolt comprises a first tubular body and a first stopper;
the locking assembly comprises a second tubular body and a second stopper;
the fifth wheel hitch comprises a securing mechanism and a base frame;
the lock engagement channel traversing through the base frame;
the lock engagement channel being positioned adjacent to the securing mechanism;
the first sleeve and the second sleeve being fixed to the base frame;
the base frame being positioned between the first sleeve and the second sleeve;
the first sleeve and the second sleeve being concentrically aligned with the lock engagement channel;
the first stopper being terminally fixed with the first tubular body;
the second stopper being terminally fixed with the second tubular body;
the first stopper being slidably engaged within the first sleeve;
the second stopper being slidably engaged within the second sleeve; and,
the key being operatively coupled with the receiver lock, wherein the locking assembly and the retractable locking bolt are connected and disconnected with each other with the key.

2. The security lock system for a fifth wheel hitch as claimed in claim 1 comprises:
the retractable locking bolt further comprises a first slot, a shaft, a base, an annular notch, and a head;
the first slot being positioned within the first tubular body and the first stopper;
the base being positioned adjacent the shaft;
the base being fixed to the shaft;
the head being positioned adjacent the shaft, opposite the base;
the base being oriented towards the first tubular body;
the head being oriented towards the first stopper;
the annular notch laterally traversing into the shaft;
the annular notch being positioned adjacent the head; and,
the shaft being slidably engaged with the first slot.

3. The security lock system for a fifth wheel hitch as claimed in claim 2 comprises:
the retractable locking bolt comprises a bed;
the bed being integrated into the first tubular body;
the bed being positioned opposite the first stopper;
the bed being positioned concentric with the first slot; and,
the base being slidably engaged within the bed.

4. The security lock system for a fifth wheel hitch as claimed in claim 2 comprises:
a locking mechanism of the locking assembly being engaged with the annular notch.

5. The security lock system for a fifth wheel hitch as claimed in claim 1 comprises:
the locking assembly comprises a locking cylinder, a locking mechanism, a plug, a keyhole, and a second slot;
the locking cylinder being mounted within the second tubular body;
the locking cylinder being positioned opposite the second stopper along the second tubular body;
the plug being rotatably mounted with the locking cylinder;
the plug being externally positioned with the second tubular body;
the keyhole traversing into the plug, opposite the locking cylinder;
the key being slidably engaged with the keyhole;
the locking mechanism being mounted within the locking cylinder;
the second slot traversing through the second stopper and the second tubular body;
the retractable locking bolt being slidably engaged with second slot; and,
the key being operatively coupled with the plug, wherein the key locks and unlocks the retractable locking bolt with the locking mechanism.

6. The security lock system for a fifth wheel hitch as claimed in claim 5 comprises:
a cap;
a ring;
the locking assembly comprises an annular indentation;
the annular indentation laterally traversing into the second tubular body;
the annular indentation being positioned around the tubular housing;
the annular indentation being positioned opposite the second stopper;
the ring being positioned within the annular indentation;
the cap being tethered with the ring; and,
the cap being frictionally and terminally engaged with the second tubular body.

7. The security lock system for a fifth wheel hitch as claimed in claim 1 comprises:
a first inner diameter of the first sleeve being equal to a first outer diameter of the first stopper.

8. The security lock system for a fifth wheel hitch as claimed in claim 1 comprises:
a second inner diameter of the second sleeve being equal to a second outer diameter of the second stopper.

9. A security lock system for a fifth wheel hitch comprises:
a receiver lock;
a fifth wheel hitch;
a first sleeve;
a second sleeve;
a lock engagement channel;
a key;
the receiver lock comprises a retractable locking bolt and a locking assembly;
the retractable locking bolt comprises a first tubular body and a first stopper;
the locking assembly comprises a second tubular body and a second stopper;
the fifth wheel hitch comprises a securing mechanism and a base frame;
the lock engagement channel traversing through the base frame;
the lock engagement channel being positioned adjacent to the securing mechanism;
the first sleeve and the second sleeve being fixed to the base frame;
the base frame being positioned between the first sleeve and the second sleeve;
the first sleeve and the second sleeve being concentrically aligned with the lock engagement channel;
the first stopper being terminally fixed with the first tubular body;
the second stopper being terminally fixed with the second tubular body;
the first stopper being slidably engaged within the first sleeve;

the second stopper being slidably engaged within the second sleeve;

the key being operatively coupled with the receiver lock, wherein the locking assembly and the retractable locking bolt are connected and disconnected with each other with the key;

a first inner diameter of the first sleeve being equal to a first outer diameter of the first stopper; and, a second inner diameter of the second sleeve being equal to a second outer diameter of the second stopper.

10. The security lock system for a fifth wheel hitch as claimed in claim 9 comprises:

the retractable locking bolt further comprises a first slot, a shaft, a base, an annular notch, a head, and a bed;

the first slot being positioned within the first tubular body and the first stopper;

the base being positioned adjacent the shaft;

the base being fixed to the shaft;

the head being positioned adjacent the shaft, opposite the base;

the base being oriented towards the first tubular body;

the head being oriented towards the first stopper;

the annular notch laterally traversing into the shaft;

the annular notch being positioned adjacent the head;

the shaft being slidably engaged with the first slot;

the bed being integrated into the first tubular body;

the bed being positioned opposite the first stopper;

the bed being positioned concentric with the first slot;

the base being slidably engaged within the bed; and, a locking mechanism of the locking assembly being engaged with the annular notch.

11. The security lock system for a fifth wheel hitch as claimed in claim 9 comprises:

a cap;

a ring;

the locking assembly comprises a locking cylinder, a locking mechanism, a plug, a keyhole, a second slot, and an annular indentation;

the locking cylinder being mounted within the second tubular body;

the locking cylinder being positioned opposite the second stopper along the second tubular body;

the plug being rotatably mounted with the locking cylinder;

the plug being externally positioned with the second tubular body;

the keyhole traversing into the plug, opposite the locking cylinder;

the key being slidably engaged with the keyhole;

the locking mechanism being mounted within the locking cylinder;

the second slot traversing through the second stopper and the second tubular body;

the retractable locking bolt being slidably engaged with second slot;

the key being operatively coupled with the plug, wherein the key locks and unlocks the retractable locking bolt with the locking mechanism;

the annular indentation laterally traversing into the second tubular body;

the annular indentation being positioned around the tubular housing;

the annular indentation being positioned opposite the second stopper;

the ring being positioned within the annular indentation;

the cap being tethered with the ring; and, the cap being frictionally and terminally engaged with the second tubular body.

12. A security lock system for a fifth wheel hitch comprises:

a receiver lock;

a fifth wheel hitch;

a first sleeve;

a second sleeve;

a lock engagement channel;

a key;

the receiver lock comprises a retractable locking bolt and a locking assembly;

the retractable locking bolt comprises a first tubular body and a first stopper;

the locking assembly comprises a second tubular body and a second stopper;

the fifth wheel hitch comprises a securing mechanism and a base frame;

the lock engagement channel traversing through the base frame;

the lock engagement channel being positioned adjacent to the securing mechanism;

the first sleeve and the second sleeve being fixed to the base frame;

the base frame being positioned between the first sleeve and the second sleeve;

the first sleeve and the second sleeve being concentrically aligned with the lock engagement channel;

the first stopper being terminally fixed with the first tubular body;

the second stopper being terminally fixed with the second tubular body;

the first stopper being slidably engaged within the first sleeve;

the second stopper being slidably engaged within the second sleeve; and, the key being operatively coupled with the receiver lock, wherein the locking assembly and the retractable locking bolt are connected and disconnected with each other with the key.

13. The security lock system for a fifth wheel hitch as claimed in claim 12 comprises:

the retractable locking bolt further comprises a first slot, a shaft, a base, an annular notch, and a head;

the first slot being positioned within the first tubular body and the first stopper;

the base being positioned adjacent the shaft;

the base being fixed to the shaft;

the head being positioned adjacent the shaft, opposite the base;

the base being oriented towards the first tubular body;

the head being oriented towards the first stopper;

the annular notch laterally traversing into the shaft;

the annular notch being positioned adjacent the head;

the shaft being slidably engaged with the first slot; and, a locking mechanism of the locking assembly being engaged with the annular notch.

14. The security lock system for a fifth wheel hitch as claimed in claim 13 comprises:

the retractable locking bolt comprises a bed;

the bed being integrated into the first tubular body;

the bed being positioned opposite the first stopper;

the bed being positioned concentric with the first slot; and, the base being slidably engaged within the bed.

15. The security lock system for a fifth wheel hitch as claimed in claim 12 comprises:

the locking assembly comprises a locking cylinder, a locking mechanism, a plug, a keyhole, and a second slot;
the locking cylinder being mounted within the second tubular body;
the locking cylinder being positioned opposite the second stopper along the second tubular body;
the plug being rotatably mounted with the locking cylinder;
the plug being externally positioned with the second tubular body;
the keyhole traversing into the plug, opposite the locking cylinder;
the key being slidably engaged with the keyhole;
the locking mechanism being mounted within the locking cylinder;
the second slot traversing through the second stopper and the second tubular body;
the retractable locking bolt being slidably engaged with second slot; and,
the key being operatively coupled with the plug, wherein the key locks and unlocks the retractable locking bolt with the locking mechanism.

16. The security lock system for a fifth wheel hitch as claimed in claim 15 comprises:
a cap;
a ring;
the locking assembly comprises an annular indentation;
the annular indentation laterally traversing into the second tubular body;
the annular indentation being positioned around the tubular housing;
the annular indentation being positioned opposite the second stopper;
the ring being positioned within the annular indentation;
the cap being tethered with the ring; and,
the cap being frictionally and terminally engaged with the second tubular body.

17. The security lock system for a fifth wheel hitch as claimed in claim 12 comprises:
a first inner diameter of the first sleeve being equal to a first outer diameter of the first stopper.

18. The security lock system for a fifth wheel hitch as claimed in claim 12 comprises:
a second inner diameter of the second sleeve being equal to a second outer diameter of the second stopper.

* * * * *